(12) United States Patent
Tetsuka

(10) Patent No.: US 9,086,282 B2
(45) Date of Patent: Jul. 21, 2015

(54) STRAIGHT-TRAVELING/TURNING DETERMINATION DEVICE

(71) Applicant: HONDA MOTOR CO., LTD., Minato-Ku, Tokyo (JP)

(72) Inventor: Takashi Tetsuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/173,945

(22) Filed: Feb. 6, 2014

(65) Prior Publication Data

US 2014/0229063 A1  Aug. 14, 2014

(30) Foreign Application Priority Data

Feb. 14, 2013  (JP) ................. 2013-026412

(51) Int. Cl.
*G01C 21/00* (2006.01)
*G01C 21/10* (2006.01)
*G08G 1/16* (2006.01)
*B62D 6/02* (2006.01)
*B60Q 1/40* (2006.01)

(52) U.S. Cl.
CPC *G01C 21/10* (2013.01); *B60Q 1/40* (2013.01); *B62D 6/02* (2013.01); *G08G 1/16* (2013.01)

(58) Field of Classification Search
CPC ............ G01C 21/10; B62D 6/02; B60Q 1/40; G08G 1/16
See application file for complete search history.

(56) References Cited

U.S. PATENT DOCUMENTS

| 5,631,829 A * | 5/1997 | Takasaki et al. ............. 701/69 |
| 8,244,443 B2 * | 8/2012 | Oshima et al. ............. 701/71 |
| 8,725,312 B2 * | 5/2014 | Mori et al. ............. 701/1 |
| 2002/0007242 A1 * | 1/2002 | Tanaka et al. ............. 701/69 |
| 2005/0021210 A1 * | 1/2005 | Bond et al. ............. 701/78 |

(Continued)

FOREIGN PATENT DOCUMENTS

| JP | S62-053256 A | 3/1987 |
| JP | 08058554 A * | 3/1996 |
| JP | 2000108872 A * | 4/2000 |

OTHER PUBLICATIONS

Li Zhai, Shouquan Dong, "Electronic differential speed steering control for four in-wheel motors independent drive vehicle," Publication Year: 2011, pp. 780-783.*

(Continued)

*Primary Examiner* — Tuan C. To
(74) *Attorney, Agent, or Firm* — Carrier Blackman & Associates, P.C.; Joseph P. Carrier; William D. Blackman

(57) ABSTRACT

A straight-traveling/turning determination device includes a straight-traveling/turning determiner that determines whether a motorcycle is traveling straight or turning by comparison between a threshold and a rotary speed comparison value that is a value resulting from comparison between the rotary speed of a front wheel and the rotary speed of a rear wheel. The straight-traveling/turning determiner uses the rotary speed comparison value in the state in which the vehicle speed is equal to or lower than first predetermined speed and an absolute value of the vehicle acceleration is equal to or lower than predetermined acceleration and a turn signal is not being actuated as a straight-traveling rotary speed comparison value, and determines that the motorcycle is turning if a ratio or difference between the rotary speed comparison value and the straight-traveling rotary speed comparison value becomes larger than a threshold.

20 Claims, 6 Drawing Sheets

(56) References Cited

U.S. PATENT DOCUMENTS

| | | | | |
|---|---|---|---|---|
| 2007/0222286 | A1* | 9/2007 | Miura | 303/140 |
| 2008/0006455 | A1* | 1/2008 | Torita | 180/6.28 |
| 2009/0260901 | A1* | 10/2009 | Ishii et al. | 180/6.5 |
| 2012/0043151 | A1* | 2/2012 | Watase | 180/230 |

OTHER PUBLICATIONS

Mutoh, N., Suzuki, K., Kawaguchi, K., "Front and rear wheel independent drive type electric vehicle (FRID EV) providing efficient running performance on various road surfaces," Publication Year: 2011, pp. 1-6.*

* cited by examiner

STRAIGHT-TRAVELING/TURNING DETERMINATION DEVICE

CROSS-REFERENCE TO RELATED APPLICATIONS

The present invention claims priority under 35 USC 119 based on Japanese patent application No. 2013-026412, filed on Feb. 14, 2013. The entire subject matter of this priority document, including specification claims and drawings thereof, is incorporated by reference herein.

BACKGROUND OF THE INVENTION

The present invention relates to a straight-traveling/turning determination device that determines whether a vehicle is traveling straight or turning.

Japanese Patent Laid-open No. 62-53256 describes a technique to carry out the canceling of a turn signal of a motorcycle. This technique determines whether the motorcycle is traveling straight or cornering based on the recognition that a difference in the rotary rate between the front and rear wheels varies between when the vehicle is traveling straight and when it is cornering. Specifically, it is determined that the vehicle is traveling straight when the difference in the rotary rate is small, and it is determined that the vehicle is cornering when the difference in the rotary rate is large.

SUMMARY OF THE INVENTION

The difference in the rotational rate between the front and rear wheels changes depending on the deterioration, wear, and air pressure change of the tire. Therefore, in the technique described in the above Japanese Patent Laid-open No. 62-53256, it is impossible to determine whether the motorcycle is traveling straight or cornering (turning) with high accuracy if the difference in the rotary rate between the front and rear wheels has changed.

So, an object of the present invention is to provide a straight-traveling/turning determination device having enhanced accuracy of determination as to whether a vehicle is traveling straight or turning.

A straight-traveling/turning determination device (100) according to the present invention has the following characteristics:

First characteristic: in the straight-traveling/turning determination device (100) including a front wheel rotary speed detector (106) that detects the rotary speed of a front wheel (18), a rear wheel rotary speed detector (108) that detects the rotary speed of a rear wheel (30), a rotary speed comparison value calculator (124) that calculates a rotary speed comparison value ($V_{diff}$) that is a value resulting from comparison between the rotary speed of the front wheel (18) and the rotary speed of the rear wheel (30), and a straight-traveling/turning determiner (128) that determines whether a vehicle (10) is traveling straight or turning based on the magnitude of the rotary speed comparison value ($V_{diff}$), a vehicle speed detector (122) that detects vehicle speed and an acceleration detector (126) that detects vehicle acceleration are provided. Furthermore, the straight-traveling/turning determiner (128) uses the rotary speed comparison value ($V_{diff}$) in a state in which the vehicle speed is equal to or lower than first predetermined speed and an absolute value of the vehicle acceleration is equal to or smaller than predetermined acceleration and a turn signal (102) is not being actuated as a straight-traveling rotary speed comparison value ($V_{diff\_s}$), and determines that the vehicle (10) is turning if a ratio or difference between the rotary speed comparison value ($V_{diff}$) and the straight-traveling rotary speed comparison value ($V_{diff\_s}$) becomes larger than a threshold (TH).

Second characteristic: the straight-traveling rotary speed comparison value ($V_{diff\_s}$) is updated if the state in which the vehicle speed is equal to or lower than the first predetermined speed and the absolute value of the vehicle acceleration is equal to or smaller than the predetermined acceleration and the turn signal (102) is not being actuated has continued for first predetermined time.

Third characteristic: the straight-traveling rotary speed comparison value ($V_{diff\_s}$) is an average value of the rotary speed comparison value ($V_{diff}$) in the first predetermined time.

Fourth characteristic: a limit is set on a change amount of the straight-traveling rotary speed comparison value ($V_{diff\_s}$) to which updating of the present time is carried out if the rotary speed comparison value ($V_{diff}$) in the state in which the vehicle speed is equal to or lower than the first predetermined speed and the absolute value of the vehicle acceleration is equal to or smaller than the predetermined acceleration and the turn signal (102) is not being actuated has a ratio or difference surpassing a predetermined value with respect to the previous straight-traveling rotary speed comparison value ($V_{diff\_s}$).

Fifth characteristic: the change amount of the straight-traveling rotary speed comparison value ($V_{diff\_s}$) to which the updating of the present time is carried out from the previous straight-traveling rotary speed comparison value ($V_{diff\_s}$) is limited to a value equal to or smaller than the predetermined value.

Sixth characteristic: the predetermined value on an increase side is set to a value equal to or smaller than the threshold (TH).

Seventh characteristic: the rotary speed comparison value ($V_{diff}$) is a ratio between the rotary speeds of the front and rear wheels.

Eighth characteristic: the rotary speed comparison value ($V_{diff}$) is a difference between the rotary speeds of the front and rear wheels.

According to the first characteristic of the present invention, the time when the vehicle is traveling straight is estimated based on the establishment of straight-traveling conditions. The rotary speed comparison value of the front and rear wheels is used as the straight-traveling rotary speed comparison value when it is estimated that the vehicle is traveling straight. Furthermore, it is determined that the vehicle is turning if the ratio or difference between the rotary speed comparison value and the straight-traveling rotary speed comparison value becomes larger than the threshold. Therefore, determination as to whether the vehicle is traveling straight or turning can be made with high accuracy even if air pressure change, deterioration, etc. of the tire has occurred.

Furthermore, the vehicle is estimated to be traveling straight when straight-traveling conditions are established. The straight driving conditions include: the vehicle speed is equal to or lower than the first predetermined speed; the absolute value of the vehicle acceleration is equal to or smaller than the predetermined acceleration; and, the turn signal is not being actuated. Therefore, the rotary speed comparison values obtained during turning or at the time of turn signal actuation from which turning is supposed to be carried out from the time, at the time of high-speed traveling in which the outer diameter of the tire readily changes due to the centrifugal force, and at the time of high acceleration or deceleration (when the absolute value of the acceleration is large) in which the tire readily slips on the road surface can be excluded from the straight-traveling rotary speed comparison value. This can further enhance the accuracy of determination as to whether the vehicle is traveling straight or turning.

According to the second characteristic of the present invention, the straight-traveling rotary speed comparison value is updated if the state in which the vehicle speed is equal to or lower than the first predetermined speed and the absolute value of the vehicle acceleration is equal to or smaller than the predetermined acceleration and the turn signal is not being actuated has continued for the first predetermined time. This can exclude the case in which the condition that the vehicle speed is equal to or lower than the first predetermined speed and the absolute value of the vehicle acceleration is equal to or smaller than the predetermined acceleration and the turn signal is not being actuated is instantaneously satisfied. Thus, the accuracy of the straight-traveling rotary speed comparison value is enhanced.

According to the third characteristic of the present invention, the straight-traveling rotary speed comparison value is the average value of the rotary speed comparison value in the first predetermined time. Therefore, the straight-traveling rotary speed comparison value can be updated to a reliable value and the accuracy of determination as to whether the vehicle is traveling straight or turning can be enhanced.

According to the fourth characteristic of the present invention, a limit is set on the change amount of the straight-traveling rotary speed comparison value to which updating of the present time is carried out if the rotary speed comparison value in the state in which the vehicle speed is equal to or lower than the first predetermined speed and the absolute value of the vehicle acceleration is equal to or smaller than the predetermined acceleration and the turn signal is not being actuated has a ratio or difference surpassing the predetermined value with respect to the previous straight-traveling rotary speed comparison value. Therefore, sudden change in the straight-traveling rotary speed comparison value can be suppressed.

According to the fifth characteristic of the present invention, the change amount of the straight-traveling rotary speed comparison value to which the updating of the present time is carried out from the previous straight-traveling rotary speed comparison value is limited to a value equal to or smaller than the predetermined value. Therefore, sudden change in the straight-traveling rotary speed comparison value can be further suppressed.

According to the sixth characteristic of the present invention, the predetermined value on the increase side is set to a value equal to or smaller than the threshold. This can effectively suppress the straight-traveling rotary speed comparison value obtained when the vehicle is deemed to be making steady circular turning.

DETAILED DESCRIPTION

The discloses straight-traveling/turning determination device will be described in detail below by showing exemplary approaches with reference to the accompanying drawings.

Figure 1:
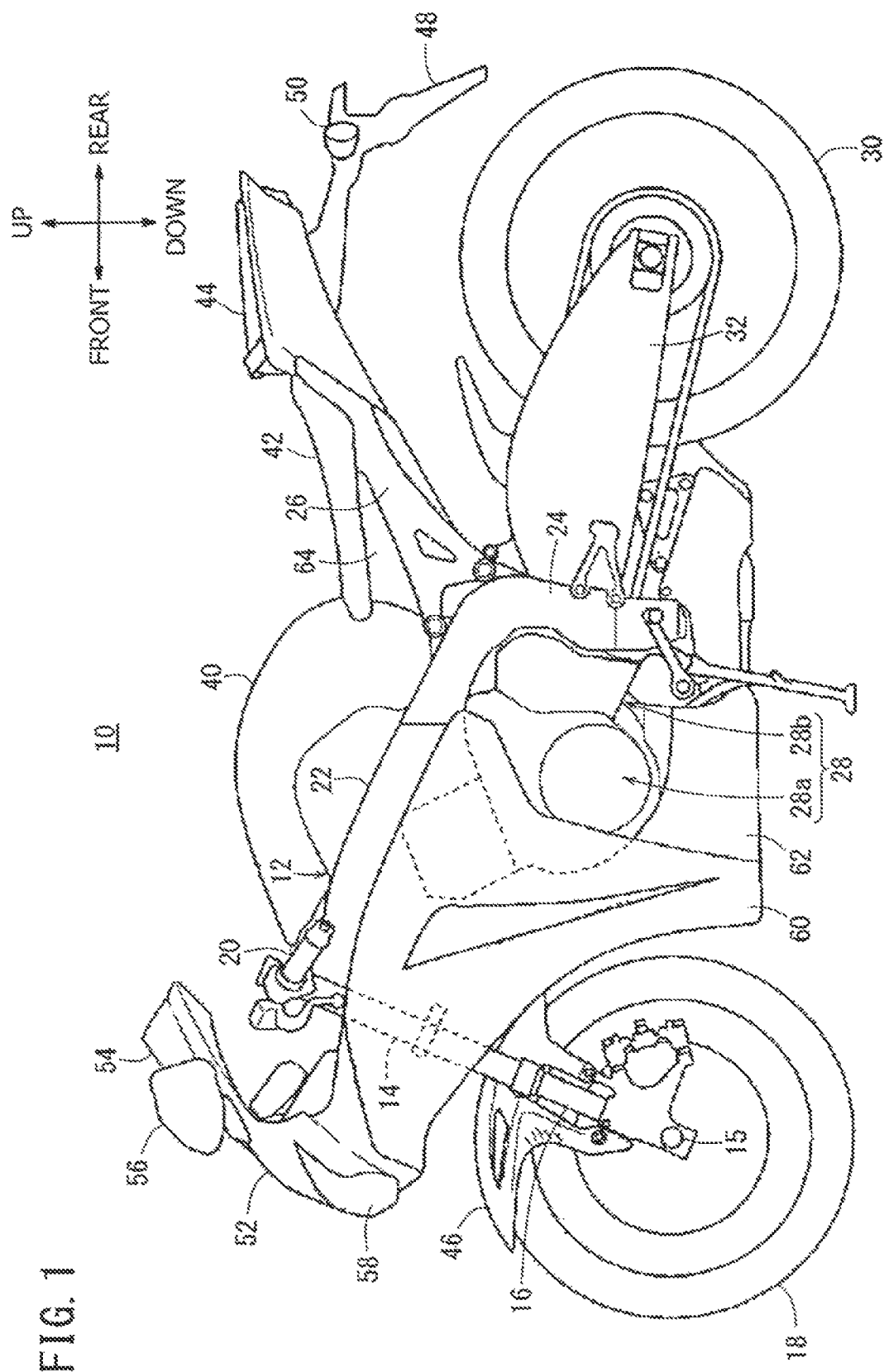
FIG. 1 is a side view of a motorcycle equipped with a straight-traveling/turning determination device.

FIG. 1 is a side view of a motorcycle 10 equipped with the straight-traveling/turning determination device. Unless a particular instruction is made, front, rear, upward, and downward directions will be described in accordance with arrow directions shown in FIG. 1 and left and right directions will be described in accordance with directions from a viewpoint of a driver sitting on the vehicle body.

The motorcycle (vehicle) 10 has a vehicle body frame 12, a head pipe 14 provided at a front end part of the vehicle body frame 12, a pair of left and right front forks 16 rotatably journaled by the head pipe 14, a front wheel (vehicle wheel) 18 as a steering wheel rotatably journaled by the pair of left and right front forks 16, and a steerable, bar-shaped handle 20 attached to an upper part of the pair of left and right front forks 16.

The vehicle body frame 12 includes a pair of left and right main frames 22 extending rearward from the head pipe 14, a pair of left and right pivot plates 24 provided on a rear side of the pair of left and right main frames 22, and a pair of left and right seat frames 26 that are provided on the pair of left and right pivot plates 24 and extend obliquely rearward and upward. A power unit 28 that generates power is provided on the pair of left and right main frames 22. A swing arm 32 rotatably journaling a rear wheel (vehicle wheel) 30 as a drive wheel is swingably supported by the pivot plate 24. The power unit 28 houses an engine 28a and a transmission 28b in its case.

A fuel tank 40 storing fuel is provided above the pair of left and right main frames 22. A driver seat 42 on which a driver sits is provided rearward of the fuel tank 40 and above the pair of left and right seat frames 26, and a pillion seat 44 on which a pillion rider sits is provided rearward of the driver seat 42. A front fender 46 is provided on the pair of left and right front forks 16 and a rear fender 48 is provided at a rear part of the pair of left and right seat frames 26. This rear fender 48 supports a rear turn signal 50.

The motorcycle 10 includes the following components: an upper cowl 52 that is provided on the vehicle body frame 12 and protects the front side; a wind screen 54 provided above the upper cowl 52; a rearview mirror 56 that is provided at the upper part of an upper cowl 52 and is for the driver to view the rear side; a headlight 58 that is provided at a front part of the upper cowl 52 and illuminates the front side; a middle cowl 60 protecting a front lateral part of the motorcycle 10; an under cover 62 that is provided below this middle cowl 60 and extends to the vehicle rear side; and a side cover 64 that is provided above the seat frames 26 and covers an area from the upper part of the seat frames 26 to a lower part of the driver seat 42. A front turn signal is incorporated in this rearview mirror 56.

Figure 2:
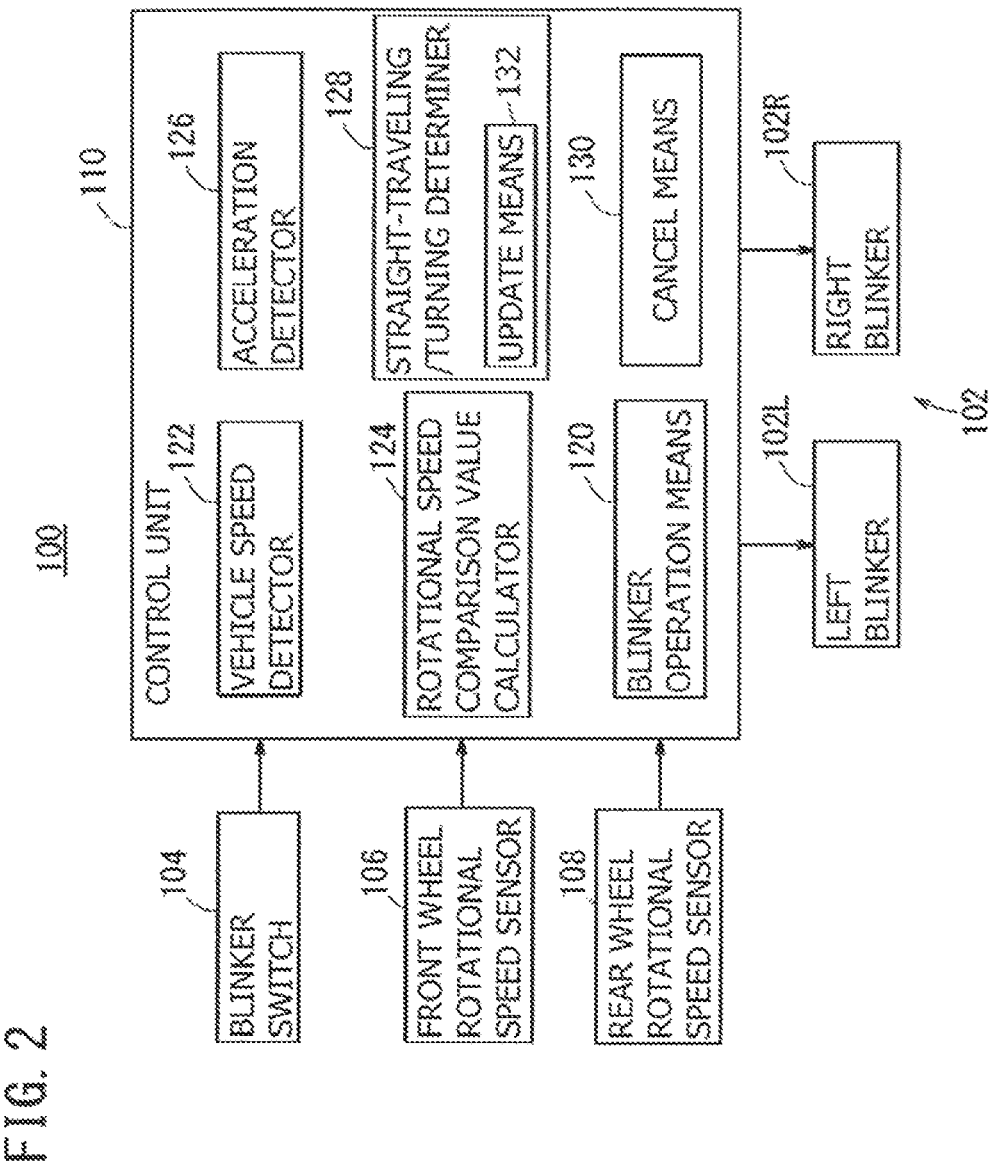
FIG. 2 is a functional block diagram of the straight-traveling/turning determination device.

FIG. 2 is a functional block diagram of a straight-traveling/turning determination device 100. The straight-traveling/turning determination device 100 includes a left turn signal 102L, a right turn signal 102R, a turn signal switch 104, a front wheel rotary speed sensor (front wheel rotary speed detector) 106, a rear wheel rotary speed sensor (rear wheel rotary speed detector) 108, and a control unit 110. The left turn signal 102L and the right turn signal 102R will be often referred to collectively as a turn signal 102.

The left turn signal 102L and the right turn signal 102R are each formed of the above-described front turn signal and the rear turn signal 50. Specifically, the front turn signal has a left front turn signal and a right front turn signal and the rear turn signal 50 has a left rear turn signal and a right rear turn signal. The left turn signal 102L is formed of the left front turn signal and the left rear turn signal and the right turn signal 102R is formed of the right front turn signal and the right rear turn signal.

The turn signal switch 104 is a switch that is provided near the handle 20 and is to light (including blinking) either one of the left turn signal 102L and the right turn signal 102R. The turn signal switch 104 has a lever that is to order lighting of the left turn signal 102L or the right turn signal 102R and is movable in the left and right directions. The turn signal switch 104 outputs an operation signal according to operation by the driver to the control unit 110.

The front wheel rotary speed sensor 106 is provided to a rotation shaft to rotate the front wheel 18 and detects rotary speed $V_{rf}$ of the front wheel 18 to output this detected rotary speed $V_{rf}$ to the control unit 110. Here, the rotary speed is described as a circumferential speed of the wheel. However, actually the number of pulses sensed by the rotary speed sensor per unit time is detected and it is multiplied by a coefficient to derive the circumferential speed. Therefore, the rotary speed is not limited to the circumferential speed and may be any as long as it is a parameter proportional to the circumferential speed, such as the rotary rate or the number of pulses of the rotary speed sensor. The rear wheel rotary speed sensor 108 is provided to a rotation shaft to rotate the rear wheel 30 and detects rotary speed $V_{rr}$ of the rear wheel 30 to output this detected rotary speed $V_{rr}$ to the control unit 110. The front wheel rotary speed sensor 106 and the rear wheel rotary speed sensor 108 are used also for other kinds of control such as anti-lock brake system (ABS) control and traction control system (TCS) control.

The control unit 110 includes turn signal operation means 120, a vehicle speed detector 122, a rotary speed comparison value calculator 124, an acceleration detector 126, a straight-traveling/turning determiner 128, and cancel means 130. The control unit 110 has at least a computer that is formed of a CPU not shown and so forth and has a timer and a memory in which programs and so forth are stored. This computer functions as the control unit 110 of the present embodiment by reading out the program stored in the memory.

The turn signal operation means 120 is to actuate the left turn signal 102L or the right turn signal 102R according to operation of the turn signal switch 104. For example, when the driver moves the above-described lever of the turn signal switch 104 to the left in order to turn left, the turn signal operation means 120 lights (actuates) the left turn signal 102L. When the driver moves the lever of the turn signal switch 104 to the right in order to turn right, the turn signal operation means 120 lights (actuates) the right turn signal 102R. When the lever of the turn signal switch 104 is pressed, the turn signal operation means 120 stops lighting (actuation) of the left turn signal 102L or the right turn signal 102R.

The vehicle speed detector 122 detects speed (vehicle speed) V of the motorcycle 10 by using at least one of the rotary speed $V_{rf}$ of the front wheel 18 detected by the front wheel rotary speed sensor 106 and the rotary speed $V_{rr}$ of the rear wheel 30 detected by the rear wheel rotary speed sensor 108. This vehicle speed V can be detected by using known technique and method and therefore description thereof is omitted.

The rotary speed comparison value calculator 124 calculates a rotary speed comparison value $V_{diff}$ that is a value resulting from comparison between the rotary speed $V_{rf}$ of the front wheel 18 detected by the front wheel rotary speed sensor 106 and the rotary speed $V_{rr}$ of the rear wheel 30 detected by the rear wheel rotary speed sensor 108. Specifically, it calculates the rotary speed comparison value $V_{diff}$ by dividing the rotary speed $V_{rf}$ of the front wheel 18 by the rotary speed $V_{rr}$ of the rear wheel 30 ($V_{diff}=V_{rf}/V_{rr}$). The rotary speed comparison value $V_{diff}$ may be a value obtained by subtracting the rotary speed $V_{rr}$ from the rotary speed $V_{rf}$ ($V_{rf}-V_{rr}$).

The acceleration detector 126 detects acceleration (vehicle acceleration) A of the motorcycle 10 by using at least one of the rotary speed $V_{rf}$ of the front wheel 18 detected by the front wheel rotary speed sensor 106 and the rotary speed $V_{rr}$ of the rear wheel 30 detected by the rear wheel rotary speed sensor 108. The acceleration detector 126 may detect the vehicle acceleration A of the motorcycle 10 based on the vehicle speed V detected by the vehicle speed detector 122 or may use an acceleration sensor separately.

The straight-traveling/turning determiner 128 determines whether the motorcycle 10 is traveling straight or turning based on the magnitude of the rotary speed comparison value $V_{diff}$. Specifically, it determines whether the motorcycle 10 is traveling straight or turning based on whether or not a ratio ($V_{diff}/V_{diff\_s}$) between the rotary speed comparison value $V_{diff}$ calculated by the rotary speed comparison value calculator 124 and the rotary speed comparison value $V_{diff}$ obtained when the motorcycle 10 is estimated to be traveling straight (hereinafter, straight-traveling rotary speed comparison value $V_{diff\_s}$) or a difference therebetween ($V_{diff}-V_{diff\_s}$) is equal to or smaller than a threshold TH.

Furthermore, the straight-traveling/turning determiner 128 has update means 132 and the update means 132 updates the straight-traveling rotary speed comparison value $V_{diff\_s}$. The outer diameters of the front wheel 18 and the rear wheel 30 change in association with the wear of the tire and so forth. When the outer diameters of the front wheel 18 and the rear wheel 30 change, the values of the rotary speeds $V_{rf}$ and $V_{rr}$ detected by the front wheel rotary speed sensor 106 and the rear wheel rotary speed sensor 108 change. Therefore, the straight-traveling rotary speed comparison value $V_{diff\_s}$ is updated in order to enhance the accuracy of determination as to whether the motorcycle 10 is traveling straight or turning.

If a predetermined condition is satisfied, the update means 132 updates the straight-traveling rotary speed comparison value $V_{diff\_s}$ based on the rotary speed comparison value $V_{diff}$ detected by the rotary speed comparison value calculator 124. If the vehicle speed V is equal to or lower than predetermined speed $V_1$ and the absolute value of the vehicle acceleration A is equal to or smaller than predetermined acceleration $A_1$ and the turn signal 102 is not being actuated, the update means 132 estimates that straight traveling is being carried out and determines that the predetermined condition is satisfied.

The cancel means 130 carries out turn signal cancel based on straight-traveling/turning determination and turn signal cancel irrespective of the straight-traveling/turning determination. The operation of this turn signal cancel will be described in detail later. The turn signal cancel refers to automatically stopping lighting (actuation) of the left turn signal 102L or the right turn signal 102R.

Next, the operation of the turn signal cancel based on the straight-traveling/turning determination by the straight-traveling/turning determination device 100 will be described along a flowchart of FIG. 3. First, the turn signal operation means 120 determines whether or not operation of the turn signal switch 104 to order actuation of the turn signal 102 is made by the driver (step S1).

If determining in the step S1 that the turn signal switch 104 is not operated, the turn signal operation means 120 remains at the step S1 until determining that it is operated. If determining that the turn signal switch 104 is operated, the turn signal operation means 120 actuates the turn signal 102 according to the operation of the turn signal switch 104 (step S2).

Subsequently, the front wheel rotary speed sensor 106 starts detection of the rotary speed $V_{rf}$ of the front wheel 18 (step S3), and the rear wheel rotary speed sensor 108 starts detection of the rotary speed $V_{rr}$ of the rear wheel 30 (step S4). The front wheel rotary speed sensor 106 and the rear wheel rotary speed sensor 108 carry out the detection at a predetermined cycle.

Then, the rotary speed comparison value calculator 124 starts calculation of the rotary speed comparison value $V_{diff}$ (step S5). Specifically, the rotary speed comparison value calculator 124 starts processing of calculating the rotary speed comparison value $V_{diff}$ that is a value resulting from comparison between the rotary speed $V_{rf}$ of the front wheel 18 detected last in the step S3 and the rotary speed $V_{rr}$ of the rear wheel 30 detected last in the step S4 ($V_{diff}=V_{rf}/V_{rr}$ or $V_{diff}=V_{rf}-V_{rr}$). The rotary speed comparison value calculator 124 calculates the rotary speed comparison value $V_{diff}$ at the above-mentioned predetermined cycle.

Next, the straight-traveling/turning determiner 128 determines whether or not the ratio between the rotary speed comparison value $V_{diff}$ calculated last in the step S5 and the straight-traveling rotary speed comparison value $V_{diff\_s}$ ($V_{diff}/V_{diff\_s}$) or the difference therebetween ($V_{diff}-V_{diff\_s}$) is larger than the threshold TH (step S6). In the case of comparing the ratio between the rotary speed comparison value $V_{diff}$ and the straight-traveling rotary speed comparison value $V_{diff\_s}$ ($V_{diff}/V_{diff\_s}$) with the threshold TH, the threshold TH is preferably equal to or smaller than 1.05 and more preferably 1.01. In the case of comparing the difference between the rotary speed comparison value $V_{diff}$ and the straight-traveling rotary speed comparison value $V_{diff\_s}$ ($V_{diff}-V_{diff\_s}$) with the threshold TH, the threshold TH is preferably 0.5 [km/h] and more preferably 0.1 [km/h].

If the ratio (or difference) between the rotary speed comparison value $V_{diff}$ and the straight-traveling rotary speed comparison value $V_{diff\_s}$ is equal to or smaller than the threshold TH in the step S6, the straight-traveling/turning determiner 128 determines that the motorcycle 10 is traveling straight (step S7) to return to the step S6. On the other hand, if determining in the step S6 that the ratio (or difference) between the rotary speed comparison value $V_{diff}$ and the straight-traveling rotary speed comparison value $V_{diff\_s}$ is larger than the threshold TH, the straight-traveling/turning determiner 128 determines that the motorcycle 10 is turning (step S8) to proceed to a step S9.

When proceeding to the step S9, the straight-traveling/turning determiner 128 determines whether or not the ratio (or difference) between the rotary speed comparison value $V_{diff}$ and the straight-traveling rotary speed comparison value $V_{diff\_s}$ calculated last in the step S5 is equal to or smaller than the threshold TH.

If determining in the step S9 that the ratio (or difference) between the rotary speed comparison value $V_{diff}$ and the straight-traveling rotary speed comparison value $V_{diff\_s}$ is not equal to or smaller than the threshold TH, the straight-traveling/turning determiner 128 determines that the motorcycle 10 is turning (step S10) to return to the step S9. In this case, the turn signal cancel is not carried out. That is, the lighting (actuation) of the left turn signal 102L or the right turn signal 102R is not stopped.

On the other hand, if determining in the step S9 that the ratio (or difference) between the rotary speed comparison value $V_{diff}$ and the straight-traveling rotary speed comparison value $V_{diff\_s}$ is equal to or smaller than the threshold TH, the straight-traveling/turning determiner 128 determines that the motorcycle 10 is traveling straight (step S11). Subsequently, the cancel means 130 carries out the turn signal cancel (step S12). That is, the lighting (actuation) of the left turn signal 102L or the right turn signal 102R is stopped.

The motorcycle 10 enters a turning action from a straight traveling action and then returns to the straight traveling action. Therefore, it is determined in the step S6 whether or not the motorcycle 10 has entered a turning action from a straight traveling action, and it is determined in the step S9 whether or not the motorcycle 10 has returned to the straight traveling action from the turning action.

Next, the operation of the turn signal cancel irrespective of the straight-traveling/turning determination by the straight-traveling/turning determination device 100 will be described along a flowchart of FIG. 4. The operation shown in FIG. 4 is carried out when actuation of one of the left turn signal 102L and the right turn signal 102R starts, and is carried out in parallel to the operation shown in FIG. 3.

Figure 3:
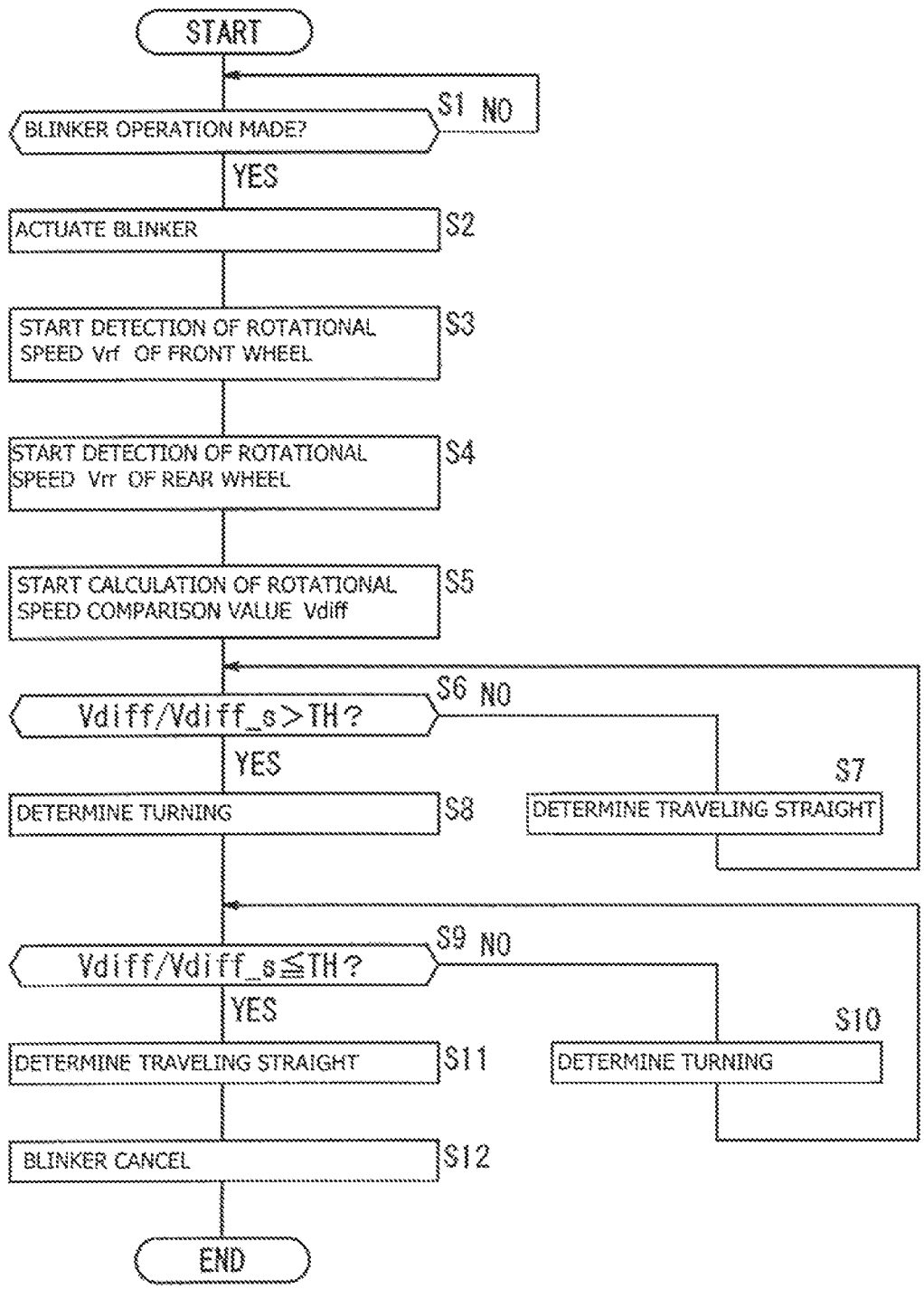
FIG. 3 is a flowchart showing operation of turn signal cancel based on a straight-traveling/turning determination by the straight-traveling/turning determination device.
Figure 4:
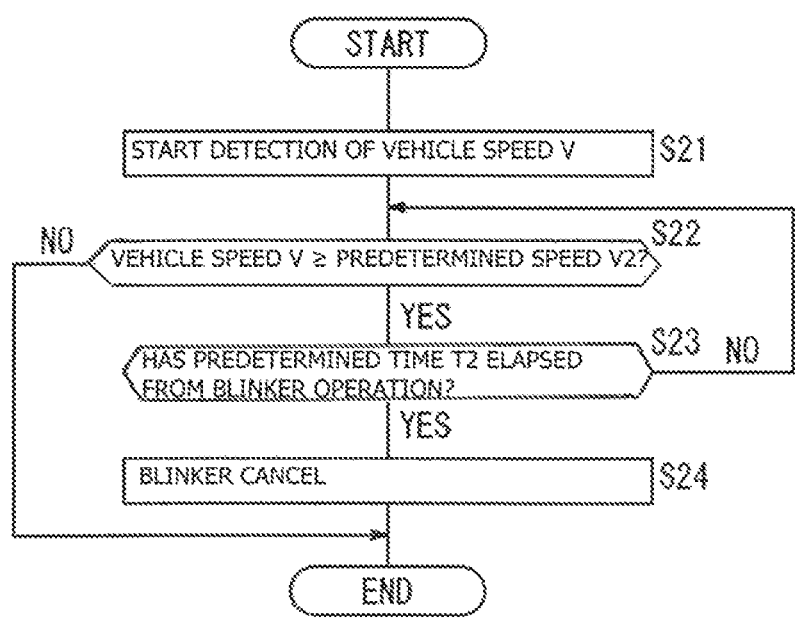
FIG. 4 is a flowchart showing operation of turn signal cancel irrespective of the straight-traveling/turning determination by the straight-traveling/turning determination device.

When the left turn signal 102L or the right turn signal 102R is actuated according to operation of the turn signal switch 104 in the step S2 in FIG. 3, the vehicle speed detector 122 starts processing of detecting the vehicle speed V by using at least one of the rotary speed $V_{rf}$ of the front wheel 18 and the rotary speed $V_{rr}$ of the rear wheel 30 detected last in the step S3 and the step S4 in FIG. 3 (step S21).

Then, the cancel means 130 determines whether or not the vehicle speed V detected last in the step S21 is equal to or higher than predetermined speed (second predetermined speed) $V_2$ (step S22). The predetermined speed $V_2$ is high speed higher than speed at which the motorcycle 10 enters a crossing when turning (turning left or turning right) at the crossing, and is set to e.g. 50 [km/h].

If determining in the step S22 that the vehicle speed V is equal to or higher than the predetermined speed $V_2$, the cancel means 130 determines whether or not predetermined time (second predetermined time) $T_2$ has elapsed from when the operation of the turn signal switch 104 is made in the step S1 in FIG. 3 (step S23). This determination as to whether or not the predetermined time $T_2$ has elapsed can be made by counting the time by the above-described timer.

If determining in the step S23 that the predetermined time $T_2$ has not elapsed from the operation of the turn signal switch 104, the cancel means 130 returns to the step S22 and repeats the above-described operation. If determining in the step S23 that the predetermined time $T_2$ has elapsed from the operation of the turn signal switch 104, the cancel means 130 carries out the turn signal cancel (step S24). That is, it carries out the turn signal cancel if the vehicle speed V is equal to or higher than the predetermined speed $V_2$ until the elapse of the predetermined time $T_2$ from the turn signal operation.

On the other hand, if it is determined in the step S22 that the vehicle speed V is lower than the predetermined speed $V_2$ before the elapse of the predetermined time $T_2$ from the turn signal operation, the processing is ended without the turn signal cancel. In this case, the actuation of the left turn signal 102L or the right turn signal 102R is stopped by the straight-traveling/turning determination shown in FIG. 3 or the operation of the above-described lever of the turn signal switch 104 by the user.

If the state in which the vehicle speed V is equal to or higher than the predetermined speed $V_2$ still continues for the predetermined time $T_2$ even after the lever of the turn signal switch 104 is operated, it is possible to consider that the motorcycle 10 is not turning at a crossing but making a lane change. Therefore, the turn signal cancel is carried out after the elapse of the predetermined time $T_2$ from the timing of the operation of the turn signal switch 104. This predetermined time $T_2$ is preferably sufficient time necessary for the lane change for example, and is set to e.g. seven seconds.

Figure 5:
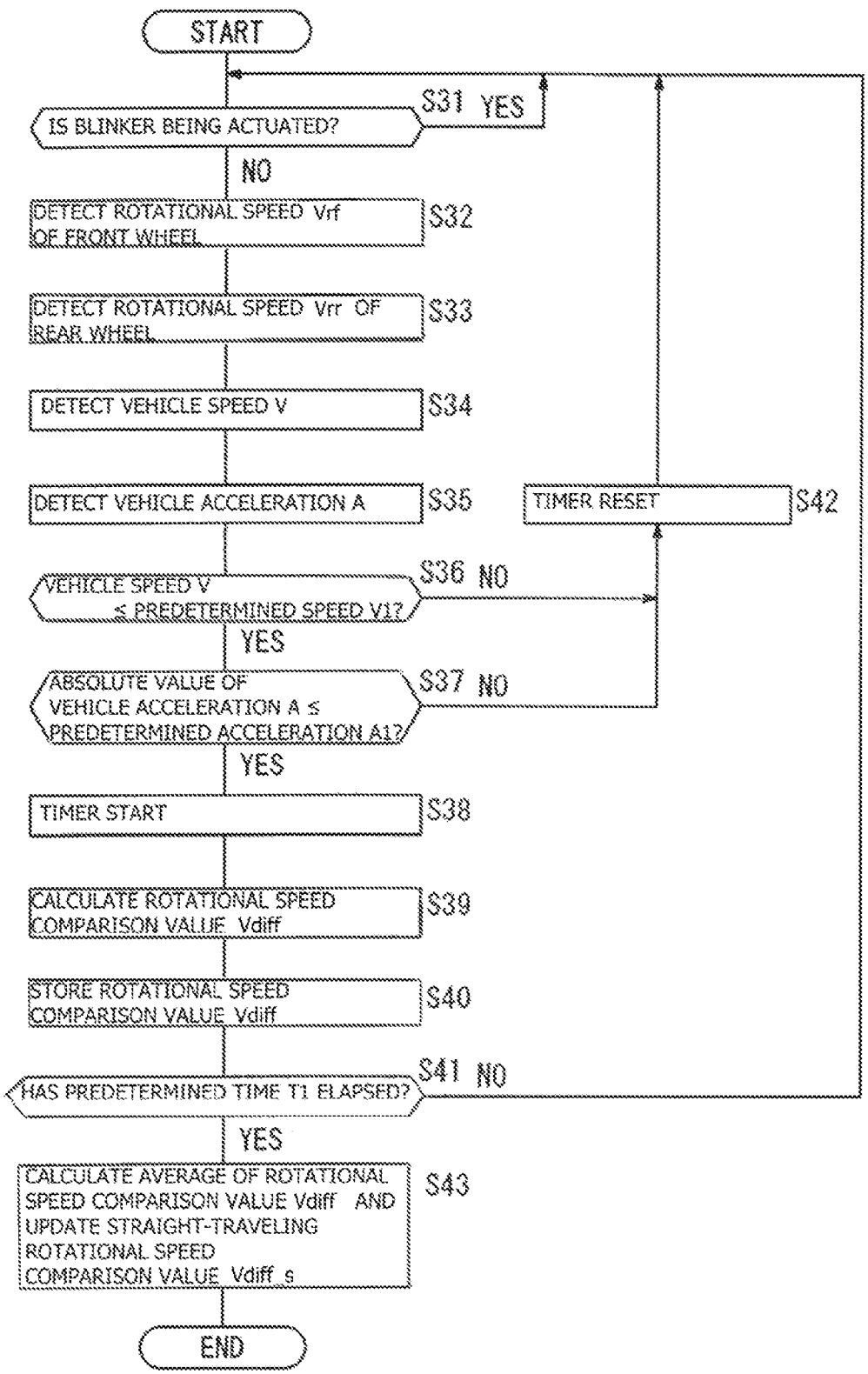
FIG. 5 is a flowchart showing operation of updating a straight-traveling rotary speed comparison value by the straight-traveling/turning determination device.

Next, operation of updating the straight-traveling rotary speed comparison value $V_{diff\_s}$ by the straight-traveling/turning determination device 100 will be described along a flowchart of FIG. 5. The update means 132 determines whether or not the left turn signal 102L or the right turn signal 102R is being actuated (step S31). If the left turn signal 102L or the right turn signal 102R is being actuated, it can be estimated that the motorcycle 10 is turning or is supposed to turn from now.

If determining in the step S31 that the left turn signal 102L or the right turn signal 102R is being actuated, the update means 132 remains at the step S31 until stop of the actuation. If the update means 132 determines that actuation of the left turn signal 102L or the right turn signal 102R is stopped, the front wheel rotary speed sensor 106 detects the rotary speed $V_{rf}$ of the front wheel 18 (step S32) and the rear wheel rotary speed sensor 108 detects the rotary speed $V_{rr}$ of the rear wheel 30 (step S33).

Then, the vehicle speed detector 122 detects the vehicle speed V by using at least one of the rotary speed $V_{rf}$ of the front wheel 18 and the rotary speed $V_{rr}$ of the rear wheel 30 detected in the step S32 and the step S33 (step S34), and the acceleration detector 126 detects the vehicle acceleration A based on the vehicle speed V detected in the step S34 (step S35).

Subsequently, the update means 132 determines whether or not the vehicle speed V detected in the step S34 is equal to or lower than the predetermined speed (first predetermined speed) $V_1$ (step S36). This predetermined speed $V_1$ is set close to the predetermined speed $V_2$ (to a value within a predetermined range from the predetermined speed $V_2$) or equal to or lower than the predetermined speed $V_2$. In the present embodiment, the predetermined speed $V_1$ is set to 50 [km/h]. The turn signal cancel control by use of the straight-traveling/turning determination based on the rotary speed comparison value $V_{diff}$ between the front and rear wheels is suitable for the timing of a right or left turn at a crossing or the like, and it is known that the vehicle speed V rarely surpasses 50 [km/h] in a right or left turn. Therefore, by setting the predetermined speed $V_1$ to 50 [km/h], the timing of this update operation can be concentrated on timing near a right or left turn at a crossing or the like and the accuracy thereof can be enhanced. When the vehicle speed V is high speed higher than the predetermined speed $V_1$, the outer diameters of the tires of the front wheel 18 and the rear wheel 30 easily change due to the centrifugal force because the rotation rate of the wheels is high.

If determining in the step S36 that the vehicle speed V is equal to or lower than the predetermined speed $V_1$, the update means 132 determines whether or not the absolute value of the vehicle acceleration A detected in the step S35 is equal to or smaller than predetermined acceleration $A_1$ (e.g. 1 [km/$h^2$]) (step S37). In the case of high acceleration or deceleration in which the absolute value of the vehicle acceleration A is larger than the predetermined acceleration $A_1$, the tires of the front wheel 18 and the rear wheel 30 are likely to be slipping on the road surface and an error readily occurs in the rotary speed comparison value $V_{diff}$ even in straight traveling.

If determining in the step S37 that the absolute value of the vehicle acceleration A is equal to or smaller than the predetermined acceleration $A_1$, the update means 132 determines that the predetermined condition is satisfied and starts the above-described timer (step S38). If the timer has already started, i.e. if the timer is counting the time, the operation of the step S38 is not carried out.

Then, the rotary speed comparison value calculator 124 calculates the rotary speed comparison value $V_{diff}$ that is a value resulting from comparison between the rotary speed $V_{rf}$ of the front wheel 18 detected in the step S32 and the rotary speed $V_{rr}$ of the rear wheel 30 detected in the step S33 (step S39), and stores this calculated rotary speed comparison value $V_{diff}$ in the above-described memory (step S40).

Subsequently, the update means 132 determines whether or not predetermined time (first predetermined time) $T_1$ has elapsed (step S41). That is, it determines whether or not the time counted by the timer has passed the predetermined time $T_1$ (e.g. three seconds). If determining in the step S41 that the counted time has not passed the predetermined time $T_1$, the update means 132 returns to the step S31 and repeats the above-described operation.

As above, branching to "No" is made in the step S41 if satisfaction of the predetermined condition (case in which the vehicle speed V is equal to or lower than the predetermined speed $V_1$ and the absolute value of the vehicle acceleration A is equal to or smaller than the predetermined acceleration $A_1$ and the turn signal 102 is not being actuated) has not continued for the predetermined time $T_1$. It is appropriate that this predetermined time $T_1$ is set to three seconds or longer. This is because the speed is rarely kept for three seconds or longer at a normal curve and therefore it can be determined that the motorcycle 10 is likely to be traveling straight if satisfaction of the predetermined condition has continued for the predetermined time $T_1$ or longer.

If it is determined in the step S36 that the vehicle speed V is not equal to or lower than the predetermined speed $V_1$ or it is determined in the step S37 that the absolute value of the vehicle acceleration A is not equal to or smaller than the predetermined acceleration $A_1$, i.e. if it is determined that the predetermined condition is not satisfied, the update means 132 resets the timer in a step S42 and returns to the step S31. In the step S42, the rotary speed comparison value $V_{diff}$ stored in the memory in the step S40 is also deleted.

On the other hand, if determining in the step S41 that the predetermined time $T_1$ has elapsed, the update means 132 calculates the average value of the plural rotary speed comparison values $V_{diff}$ stored in the predetermined time $T_1$ and updates the straight-traveling rotary speed comparison value $V_{diff\_s}$ to this calculated average value (step S43).

Figure 6:
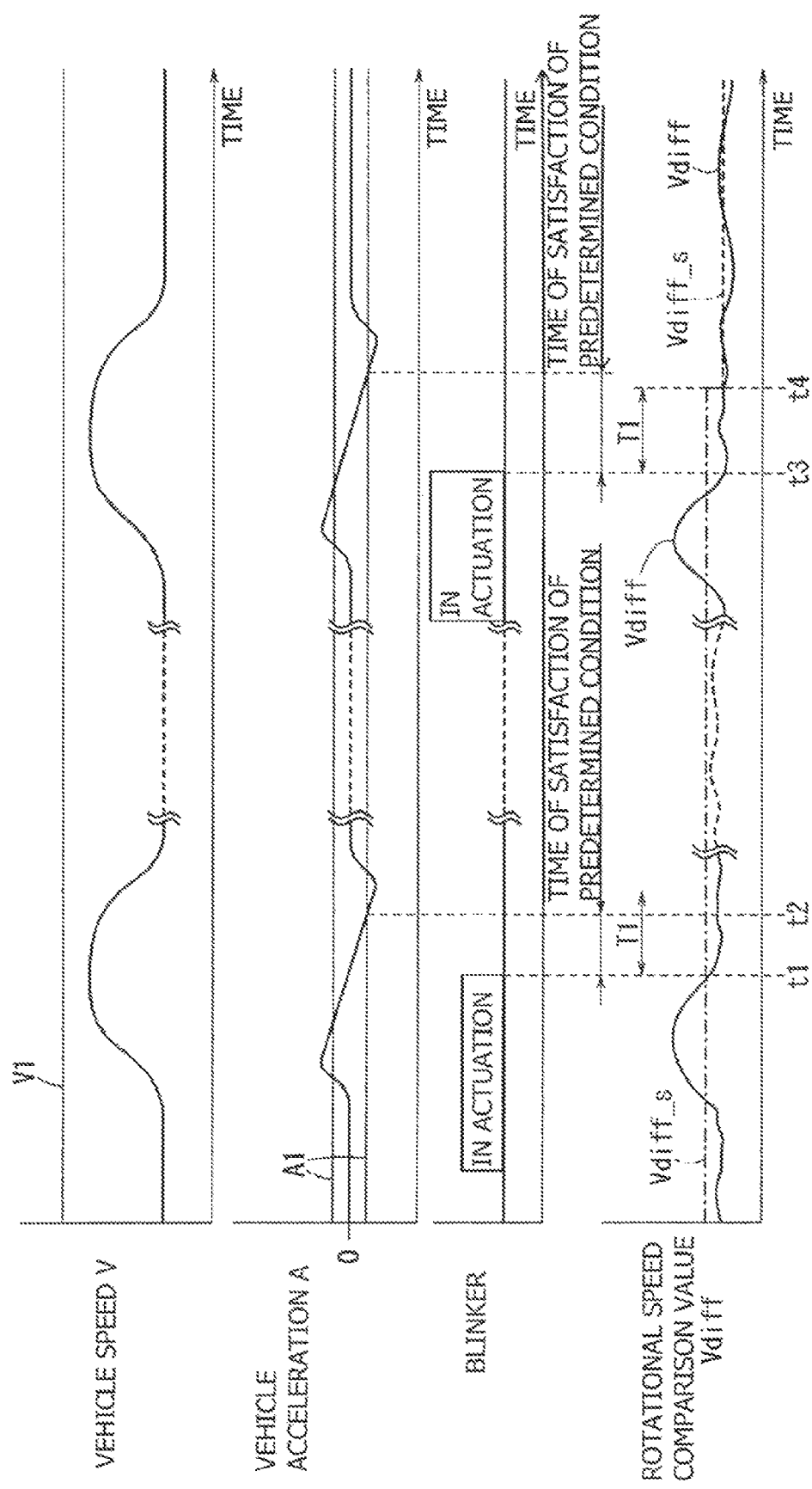
FIG. 6 is a time chart showing the relationship among a vehicle speed, a vehicle acceleration, actuation and non-actuation of a turn signal, a rotary speed comparison value, and the straight-traveling rotary speed comparison value.

FIG. 6 is a time chart showing the relationship among the vehicle speed V, the vehicle acceleration A, actuation and non-actuation of the turn signal 102, the rotary speed comparison value $V_{diff}$ and the straight-traveling rotary speed comparison value $V_{diff\_s}$. As shown in FIG. 6, the rotary speed comparison value $V_{diff}$ is calculated and stored (step S39 and step S40 in FIG. 5) from timing t1, at which the vehicle speed V is equal to or lower than the predetermined speed $V_1$ and the absolute value of the vehicle acceleration A is equal to or smaller than the predetermined acceleration $A_1$ and the turn signal 102 becomes the non-actuated state. However, the absolute value of the vehicle acceleration A becomes larger than the predetermined acceleration $A_1$ at timing t2, which is before the elapse of the predetermined time $T_1$ from the timing t1 (i.e. the time of satisfaction of the predetermined condition is shorter than the predetermined time $T_1$). Thus, update of the straight-traveling rotary speed comparison value $V_{diff\_s}$ is not carried out. In this case, the rotary speed comparison value $V_{diff}$ stored in the period from the timing t1 to the timing t2 is deleted.

Furthermore, the rotary speed comparison value $V_{diff}$ is calculated and stored (step S39 and step S40 in FIG. 5) from timing t3, at which the vehicle speed V is equal to or lower than the predetermined speed $V_1$ and the absolute value of the vehicle acceleration A is equal to or smaller than the predetermined acceleration $A_1$ and the turn signal 102 becomes the non-actuated state. Then, the predetermined condition is satisfied at least for the period until timing t4, which is at the elapse of the predetermined time $T_1$ from the timing t3. Thus, the straight-traveling rotary speed comparison value $V_{diff\_s}$ is updated to the average value of the rotary speed comparison value $V_{diff}$ stored in the period from the timing t3 to the timing t4. Therefore, the straight-traveling rotary speed comparison value $V_{diff\_s}$ is updated at the timing t4.

In this manner, the time when straight traveling is being carried out is surely estimated by determining whether or not the predetermined condition is satisfied, and the straight-traveling rotary speed comparison value $V_{diff\_s}$ is updated to the rotary speed comparison value $V_{diff}$ of the front wheel 18 and the rear wheel 30 at this time. Therefore, determination as to whether the motorcycle 10 is traveling straight or turning can be made with high accuracy even if air pressure change, deterioration, etc. of the tire has occurred.

Furthermore, the rotary speed comparison value $V_{diff}$ in the state in which the predetermined condition is satisfied (state in which the vehicle speed V is equal to or lower than the predetermined speed $V_1$ and the absolute value of the vehicle acceleration A is equal to or smaller than the predetermined acceleration $A_I$ and the turn signal 102 is not being actuated) is used as the straight-traveling rotary speed comparison value $V_{diff\_s}$. Therefore, the rotary speed comparison values $V_{diff}$ obtained during turning or at the time of turn signal actuation from which turning is supposed to be carried out from the time, at the time of high-speed traveling in which the outer diameter of the tire readily changes due to the centrifugal force, and at the time of high acceleration or deceleration in which the tire readily slips on the road surface can be excluded from the straight-traveling rotary speed comparison value $V_{diff\_s}$. This can further enhance the accuracy of determination as to whether the motorcycle 10 is traveling straight or turning.

Because the straight-traveling rotary speed comparison value $V_{diff\_s}$ is updated if satisfaction of the predetermined condition has continued for the predetermined time $T_1$, the case in which the predetermined condition is instantaneously satisfied can be excluded, which enhances the accuracy of the straight-traveling rotary speed comparison value $V_{diff\_s}$.

Because the average value of the rotary speed comparison value $V_{diff}$ in the predetermined time $T_1$ is used as the straight-traveling rotary speed comparison value $V_{diff\_s}$, the straight-traveling rotary speed comparison value $V_{diff\_s}$ can be updated to a reliable value and the accuracy of determination as to whether the motorcycle 10 is traveling straight or turning can be enhanced.

If the vehicle speed V is equal to or higher than the predetermined speed $V_2$, actuation of the turn signal 102 is automatically stopped at the timing of the elapse of the predetermined time $T_2$ from actuation operation of the turn signal 102 irrespective of a determination result by the straight-traveling/turning determiner 128. Therefore, the turn signal cancel can be properly carried out not only in a left or right turn but even in a lane change, in which the difference in the rotary speed between the front wheel 18 and the rear wheel 30 is extremely small. Moreover, because the predetermined speed $V_i$ is set to a value close to the predetermined speed $V_2$ or lower than it, the straight-traveling rotary speed comparison value $V_{diff\_s}$ is not updated at the time of high-speed traveling, in which the turn signal cancel based on straight-traveling/turning determination is not carried out and the straight-traveling rotary speed comparison value $V_{diff\_s}$ can be updated in a proper vehicle speed range.

Various other exemplary approaches to the above disclosure are also possible. For example, if the average value of the rotary speed comparison value $V_{diff}$ when the predetermined condition is satisfied for the predetermined time $T_1$ has a ratio or difference surpassing a predetermined value with respect to the previous straight-traveling rotary speed comparison value $V_{diff\_s}$, a limit may be set on the straight-traveling rotary speed comparison value $V_{diff\_s}$ to which the updating of the present time is carried out. That is, a change amount of the straight-traveling rotary speed comparison value $V_{diff\_s}$ to which the updating of the present time is carried out from the previous straight-traveling rotary speed comparison value $V_{diff\_s}$ is limited to a value equal to or smaller than the predetermined value. This can suppress sudden change in the straight-traveling rotary speed comparison value $V_{diff\_s}$.

This predetermined value on the increase side (predetermined value of the case in which the present straight-traveling rotary speed comparison value $V_{diff\_s}$ is larger than the previous straight-traveling rotary speed comparison value $V_{diff\_s}$) may be set to a value equal to or smaller than the threshold TH. This can effectively suppress the straight-traveling rotary speed comparison value $V_{diff\_s}$ obtained when the motorcycle 10 is deemed to be making steady circular turning. Specifically, in steady circular turning, it is determined that the predetermined condition is satisfied in some cases. However, by setting the predetermined value on the increase side to the threshold TH, the straight-traveling rotary speed comparison value $V_{diff\_s}$ updated in the case of the steady circular turning can be effectively suppressed.

As another example, the average value of the plural rotary speed comparison values $V_{diff}$ stored in the predetermined time $T_1$ is used as the straight-traveling rotary speed comparison value $V_{diff\_s}$. However, any one rotary speed comparison value $V_{diff}$ (e.g. the minimum rotary speed comparison value $V_{diff}$ or the latest rotary speed comparison value $V_{diff}$) stored in the predetermined time T1 may be used as the straight-traveling rotary speed comparison value $V_{diff\_s}$. Alternatively, if the predetermined condition is satisfied, immediately the straight-traveling rotary speed comparison value $V_{diff\_s}$ may be updated without waiting for the elapse of the predetermined time $T_1$. In this case, the straight-traveling rotary speed comparison value $V_{diff\_s}$ is updated to the rotary speed comparison value $V_{diff}$ obtained when the predetermined condition is satisfied.

In another exemplary approach, the straight-traveling/turning determination device 100 is used for turn signal cancel. However, in a motorcycle, it may be used for estimation of the bank angle of the vehicle body.

Although the present invention is described above by using the preferred embodiment, the technical scope of the present invention is not limited to the scope of the description of the above embodiment. It is apparent for those skilled in the art that various changes or improvements can be added to the above-described embodiment. It is apparent from the description of the scope of the claims that modes obtained by adding such changes or improvements can also be included in the technical scope of the present invention. Furthermore, symbols in parentheses described in the scope of the claims are given after symbols in the accompanying drawings for facilitation of understanding of the present invention and the present invention shall not be interpreted as being limited by elements given the symbols.

The invention claimed is:

1. An apparatus for determining whether a vehicle is traveling straight or turning, comprising:
a vehicle speed detector that detects vehicle speed;
an acceleration detector that detects vehicle acceleration;
a front wheel rotary speed detector that detects rotary speed of a front wheel;
a rear wheel rotary speed detector that detects rotary speed of a rear wheel;
a vehicle computer for receiving input from the vehicle speed detector, the acceleration detector, the front wheel rotary speed detector, and the rear wheel rotary speed detector and configured to:
calculate a rotary speed comparison value based on a comparison between the rotary speed of the front wheel and the rotary speed of the rear wheel;
use the rotary speed comparison value under straight-traveling conditions as a straight-traveling rotary speed comparison value, the straight-traveling conditions including:
the vehicle speed is equal to or lower than first predetermined speed,
an absolute value of the vehicle acceleration is equal to or smaller than predetermined acceleration, and
a turn signal is not being actuated; and
determine that the vehicle is turning if one of a ratio and a difference between an instant rotary speed comparison value and the straight-traveling rotary speed comparison value exceeds a threshold.

2. The straight-traveling/turning determination device according to claim 1, wherein the vehicle computer updates the straight-traveling rotary speed comparison value if the straight-traveling conditions persist for a first predetermined amount of time.

3. The straight-traveling/turning determination device according to claim 2, wherein the straight-traveling rotary speed comparison value is an average value of the instantaneous rotary speed comparison values over the first predetermined amount of time.

4. The straight-traveling/turning determination device according to claim 1, wherein an updated straight-traveling rotary speed comparison value is limited from exceeding a previous straight-traveling rotary speed comparison value when the difference between the updated value and the previous value surpasses a predetermined value.

5. The straight-traveling/turning determination device according to claim 4, wherein the updated value is limited from changing more than a change amount that is a value equal to or smaller than the predetermined value.

6. The straight-traveling/turning determination device according to claim 1, wherein the rotary speed comparison value is a ratio between the rotary speeds of the front and rear wheels.

7. The straight-traveling/turning determination device according to claim 1, wherein the rotary speed comparison value is a difference between the rotary speeds of the front and rear wheels.

8. A straight-traveling/turning determination device, comprising:
a vehicle speed detector that detects vehicle speed;
an acceleration detector that detects vehicle acceleration;
a front wheel rotary speed detector that detects rotary speed of a front wheel;
a rear wheel rotary speed detector that detects rotary speed of a rear wheel;
a rotary speed comparison value calculator that calculates a rotary speed comparison value based on a comparison between the rotary speed of the front wheel and the rotary speed of the rear wheel; and
a straight-traveling/turning determiner that determines whether a vehicle is traveling straight or turning based on magnitude of the rotary speed comparison value,
wherein the straight-traveling/turning determiner uses the rotary speed comparison value under straight-traveling conditions as a straight-traveling rotary speed comparison value, the straight-traveling conditions including:
the vehicle speed is equal to or lower than first predetermined speed,
an absolute value of the vehicle acceleration is equal to or smaller than predetermined acceleration, and
a turn signal is not being actuated, and
wherein the straight-traveling/turning determiner determines that the vehicle is turning if one of a ratio and a difference between an instant rotary speed comparison value and the straight-traveling rotary speed comparison value exceeds a threshold.

9. The straight-traveling/turning determination device according to claim 8, wherein the straight-traveling rotary speed comparison value is updated if the straight-traveling conditions persist for a first predetermined amount of time.

10. The straight-traveling/turning determination device according to claim 9, wherein the straight-traveling rotary speed comparison value is an average value of the instantaneous rotary speed comparison values over the first predetermined amount of time.

11. The straight-traveling/turning determination device according to claim 8, wherein an updated straight-traveling rotary speed comparison value is limited from exceeding a previous straight-traveling rotary speed comparison value when the difference between the updated value and the previous value surpasses a predetermined value.

12. The straight-traveling/turning determination device according to claim 11, wherein the updated value is limited from changing more than a change amount that is a value equal to or smaller than the predetermined value.

13. The straight-traveling/turning determination device according to claim 11, wherein the predetermined value on an increase side is set to a value equal to or smaller than the threshold.

14. The straight-traveling/turning determination device according to claim 8, wherein the rotary speed comparison value is a ratio between the rotary speeds of the front and rear wheels.

15. The straight-traveling/turning determination device according to claim 8, wherein the rotary speed comparison value is a difference between the rotary speeds of the front and rear wheels.

16. A method for determining whether a vehicle is traveling straight or turning, comprising:
detecting vehicle speed from a vehicle speed detector;
detecting vehicle acceleration from an acceleration detector;
detecting rotary speed of a front wheel from a front wheel rotary speed detector;
detecting rotary speed of a rear wheel from a rear wheel rotary speed detector;

periodically calculating a rotary speed comparison value based on a comparison between the rotary speed of the front wheel and the rotary speed of the rear wheel;

setting a straight-traveling rotary speed comparison value from a particular rotary speed comparison value under straight-traveling conditions, the straight-traveling conditions including:
- the vehicle speed is equal to or lower than first predetermined speed,
- an absolute value of the vehicle acceleration is equal to or smaller than predetermined acceleration, and
- a turn signal is not being actuated; and determining that the vehicle is turning if one of a ratio and a difference between an current rotary speed comparison value and the straight-traveling rotary speed comparison value exceeds a threshold.

17. The method for determining whether a vehicle is traveling straight or turning according to claim 16, wherein the straight-traveling rotary speed comparison value is updated if the straight-traveling conditions persist for a first predetermined amount of time.

18. The method for determining whether a vehicle is traveling straight or turning according to claim 16, wherein an updated straight-traveling rotary speed comparison value is limited from exceeding a previous straight-traveling rotary speed comparison value when the difference between the updated value and the previous value surpasses a predetermined value.

19. The method for determining whether a vehicle is traveling straight or turning according to claim 16, wherein the rotary speed comparison value is a ratio between the rotary speeds of the front and rear wheels.

20. The method for determining whether a vehicle is traveling straight or turning according to claim 16, wherein the rotary speed comparison value is a difference between the rotary speeds of the front and rear wheels.

* * * * *